April 17, 1934.  F. E. KEY  1,955,003
TUBE CONNECTING DEVICE
Filed March 30, 1933     4 Sheets-Sheet 1
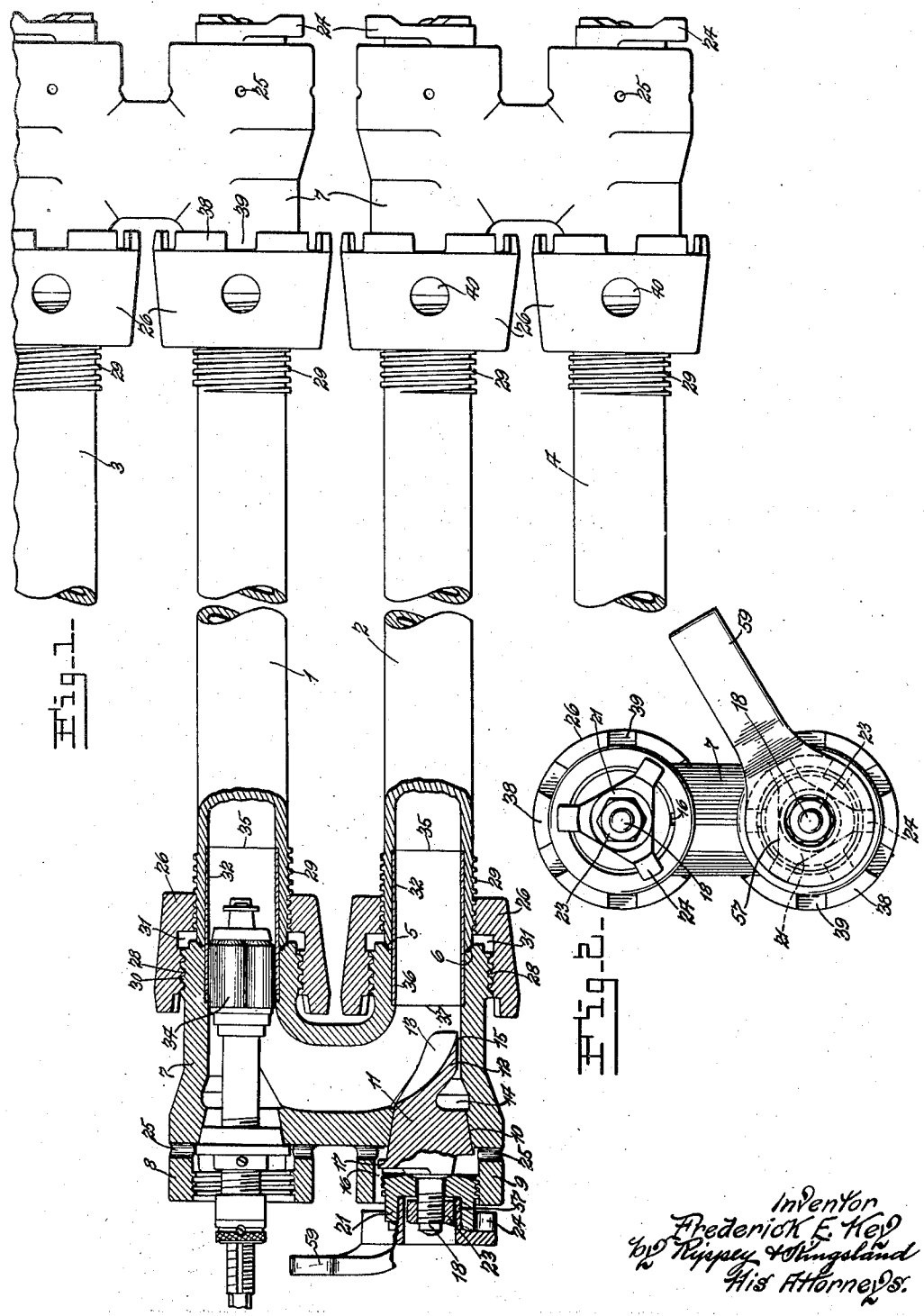

April 17, 1934.　　　　　F. E. KEY　　　　　1,955,003
TUBE CONNECTING DEVICE
Filed March 30, 1933　　　4 Sheets-Sheet 2

Inventor
Frederick E. Key
by Rippey & Kingsland
His Attorneys

April 17, 1934.  F. E. KEY  1,955,003
TUBE CONNECTING DEVICE
Filed March 30, 1933  4 Sheets-Sheet 3
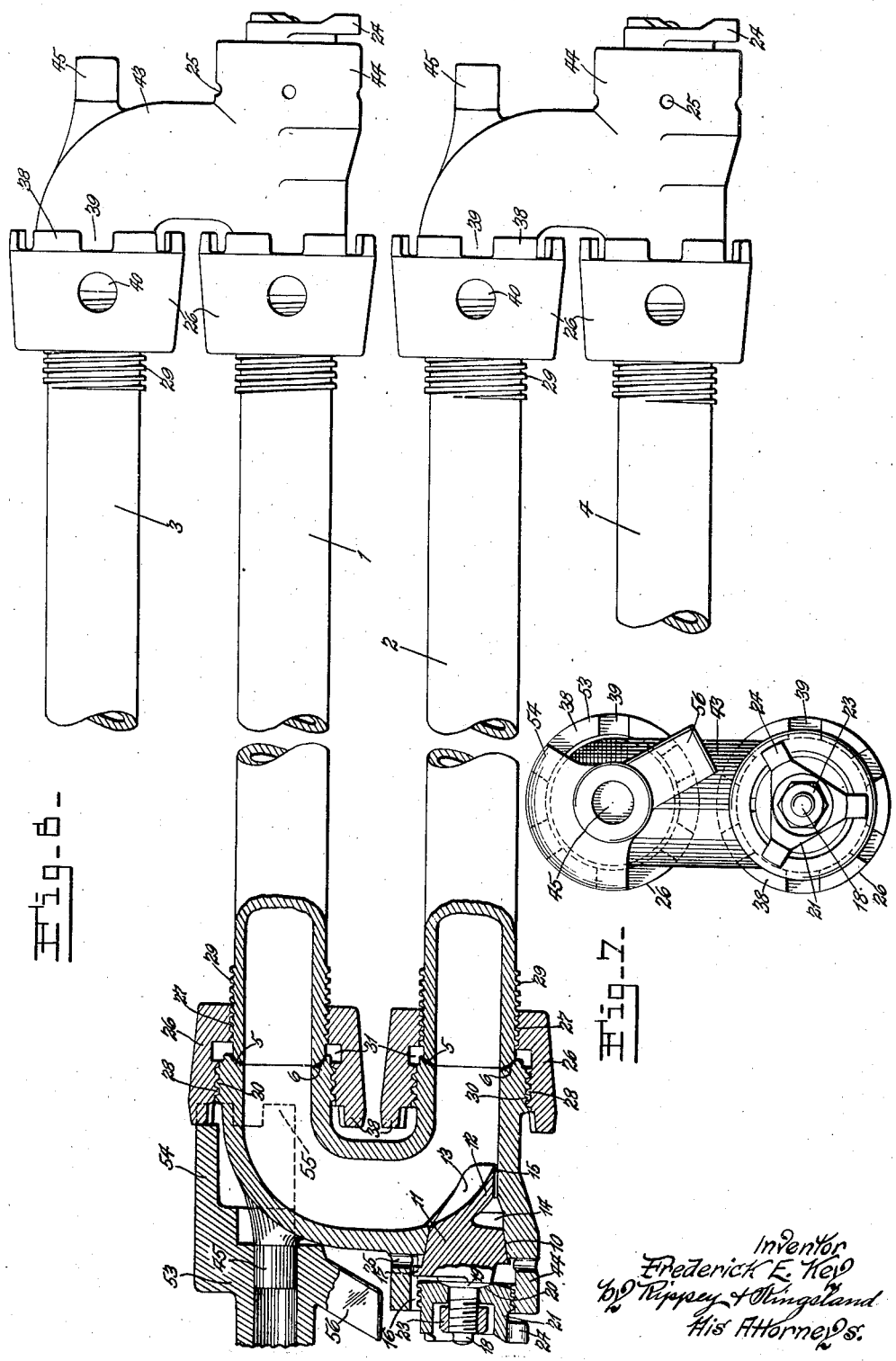

April 17, 1934.  F. E. KEY  1,955,003
TUBE CONNECTING DEVICE
Filed March 30, 1933  4 Sheets-Sheet 4
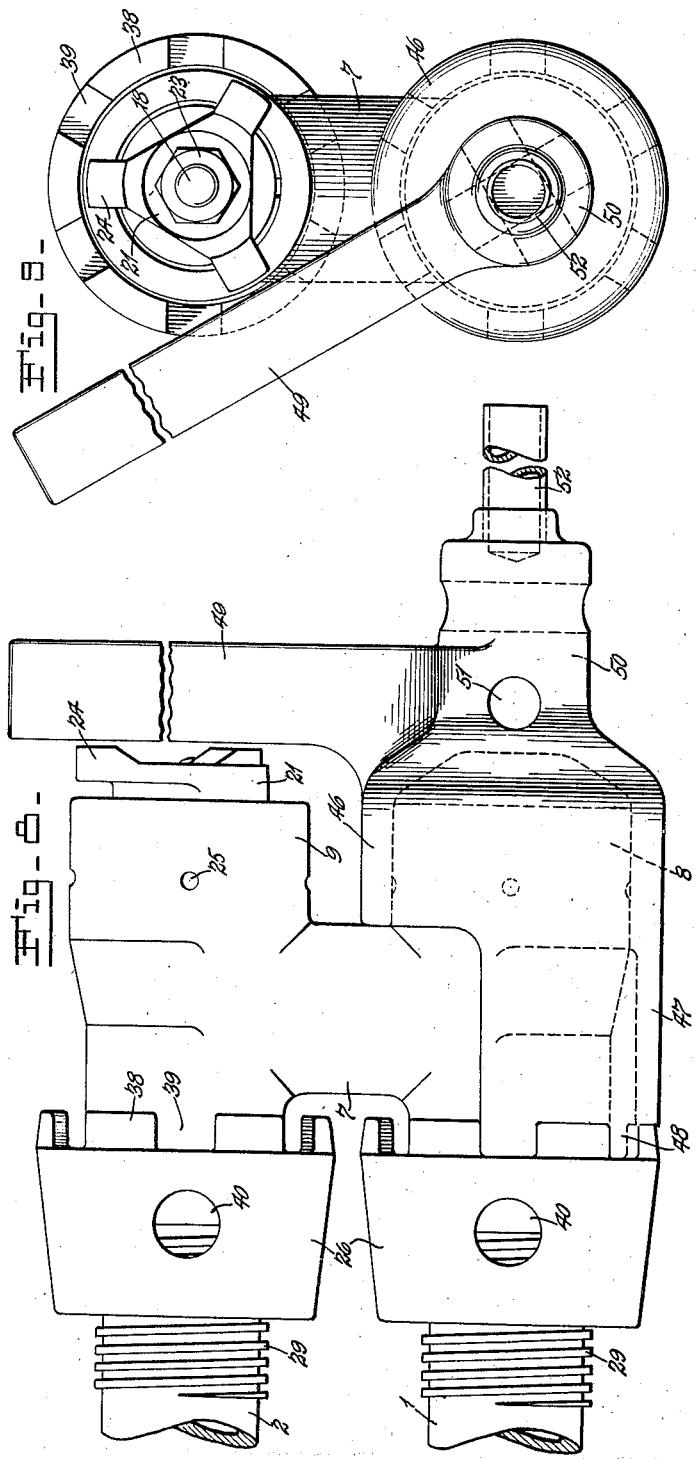

Patented Apr. 17, 1934

1,955,003

UNITED STATES PATENT OFFICE 1,955,003

TUBE CONNECTING DEVICE

Frederick E. Key, St. Louis, Mo., assignor to Key Boiler Equipment Company, East St. Louis, Ill., a corporation of Missouri Application March 30, 1933, Serial No. 663,459

9 Claims. (Cl. 29—148)

This invention relates to tube connecting devices, and has special reference to devices designed and adapted for use in oil cracking stills as well as other tubular structures where it is essential to maintain leak-proof joints between adjacent ends of adjacent tubes, notwithstanding variations in high temperatures of the fluids confined in or passing through the tubes.

Objects of the invention are to provide a connecting device for maintaining communication between adjacent ends of adjacent tubes and for holding said ends of said tubes fixed relatively to each other and to said device; to provide one or more openings in said connecting device through which access is afforded to the inside of said device and to said tubes; to provide removable deflector plugs of novel construction and arrangement for closing said openings, formed with relatively large relieved surfaces or recesses having communication with the inside of the attached connecting device and adapted to receive and contain a substantial mass of coke of porous characteristic as contrasted with coke of hard substantially non-porous characteristic that is formed in smaller surfaces, in order to facilitate the breaking of the coke and the removal of the deflector plugs; to provide improved means for mounting and securing said deflector plugs in proper relationship so that the inner surfaces of said plugs will be continuous with the inner surface of the connecting device; to provide improved couplings for holding said connecting device in connection with said tubes; to provide improved leak-proof joints between said tubes and said connecting device; to provide means for discharging particles of coke or other foreign matter from the coupling device when any deflector plug is removed and during the cleaning of the tube thereafter, and also for indicating to the operator when any particular joint of the connecting device with the tubes may be leaking; and to provide all of the other improved features of construction herein disclosed or made apparent from the following description, reference being made to the annexed drawings, in which—

Fig. 1 is a view showing one of the connecting devices in section and also showing a number of tubes having my improved connecting device in connection therewith.

Fig. 2 is an end elevation of one of the complete connecting devices of the type shown in Fig. 1.

Fig. 6 is a view, similar to Fig. 1, showing a modified form of connecting device.

Fig. 7 is an end elevation of a complete connecting device of the type shown in Fig. 6.

Fig. 8 is a side elevation of a wrench applied to the device for operating one of the threaded couplings.

Fig. 9 is an end elevation showing this wrench in connection with the coupling to be operated thereby.

Figure 3:
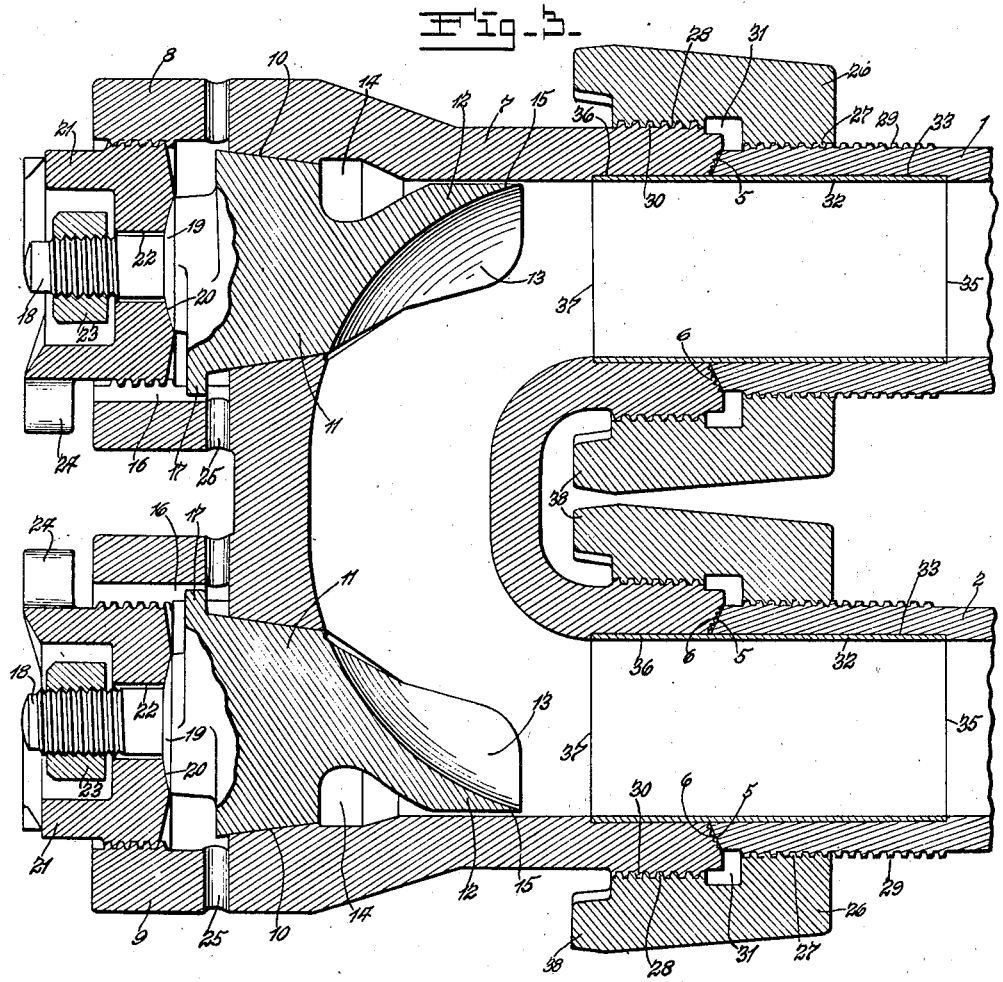
Fig. 3 is an enlarged sectional view of one of the connecting devices forming communication between adjacent ends of adjacent tubes.

As shown, the tubes 1 and 2 are to be connected and placed in communication at one end while the opposite end of the tube 1 is connected and in communication with the adjacent end of a tube 3, and the end of the tube 2 opposite from that end which is connected and in communication with the tube 1 is connected and in communication with a tube 4. While these tubes are shown in parallel relationship, they may be disposed angularly or otherwise than in parallel relationship. The ends 5 of the respective tubes are arcuate, being formed on a radius of curvature and are adapted to be engaged by the ends 6 of the connecting device 7, which are formed on the same radius of curvature as the ends 5 and are relieved or grooved, as sufficiently shown in Fig. 3 of the drawings, in order that the metal at the relieved surface may flow more readily because of the smaller bearing area and thereby overcome any imperfection in the abutting surfaces and provide a leak-proof joint irrespective of minor imperfections in said abutting surfaces. These forms of abutting surfaces are merely illustrated as there are numerous types of joints which may satisfactorily be used with the present invention.

When adjacent ends of approximately parallel tubes are to be connected and placed in communication, the connecting device 7 is approximately U-shaped and has one or more outwardly extended tubular portions 8 and 9 and an inwardly tapered opening 10 into the device 7 from the inner ends of the tubular portions 8 and 9. These openings 10 are in exact or approximate alinement with the open ends of the passage through the device 7 and with the tubes 1 and 2.

The walls of the openings 10 are smoothly ground and constitute seats for the smoothly ground peripheral surfaces of the deflector plugs 11, so that when a deflector plug 11 is properly mounted in an opening 10, an hermetic and leakproof joint is formed by the contacting surfaces of the wall of the opening 10 and the peripheral surface of the deflector plug 11. Clearly, this leak-proof joint may be obtained otherwise than by tapered openings and plugs, and I contemplate such variations.

Each deflector plug 11 has an inwardly extended skirt 12 having its inner surface 13 curving concentrically with and about the axis of the passage through the device 7. Thus, the wall 13 of each skirt 12 forms a continuous smooth wall surface of the proper curvature to deflect the flowing oil or other fluid, liquid or gaseous, passing through the device from the pipe 1 to the pipe 2, and vice versa.

Each plug 11 is formed with a relief or recess 14, which will become filled with a body of coke of a porous and frangible characteristic, permitting easy removal of the plug. A narrow passage 15 from the relief or recess 14 separates the arcuate outer surface of the skirt 12 from the correspondingly shaped inner surface of the passage through the device 7 and may become filled with a thin layer of coke having a less porous and less frangible characteristic than the mass of coke accumulated or formed in the relief or recess 14.

This construction facilitates the provision of a leak-proof joint between the body of the plug 11 and the wall of the opening 10, because of the comparatively short length of the abutting surfaces along which perfect fit and leak-proof contact must be obtained. Accordingly, the several advantages indicated, and others which should now be apparent, are obtained by the provision of the relatively large relief or recess 14.

The inner wall of each tubular extension 8 and 9 has a groove 16 designed and adapted to receive a laterally extended lug 17 rigid with the body of the plug 11. The groove 16 and the engaging lug 17 constitute means for locating and guiding the plug 11 to the exact proper position for proper functioning of the skirt 12.

An outwardly extended threaded stem 18 projects axially from the outer end of the body of the plug 11. An outwardly convexed annular shoulder 19 is formed on the outer end of the plug 11 at the union of the stem 18 with the body of the plug 11 and is abutted by a similarly curved annular wall 20 on the inner end of a screw plug 21. The screw plug 21 has an enlarged axial hole 22 through which the stem 18 extends. The hole 22 is preferably of somewhat larger diameter than the diameter of the stem 18 in order to permit free cooperation with the walls 19 and 20 without any restraint or limitation of such cooperation by the stem 18. By this construction, I obtain a greater bearing area between the abutting surfaces of the plugs 11 and 21 and the very considerable stresses to which these parts are subjected are more evenly distributed.

The inner ends of the plugs 21 are circumferentially threaded and screw into threads formed on the inner sides of the tubular portions 8 and 9.

A nut 23 is screwed on the stem 18 and functions as a jack or release device to apply a very considerable pressure on the plug 11 to start said plug from its seat against the wall around the opening 10 when it is desired to remove the plug 11.

The plug 21 is formed with a number of laterally extended arms 24 adapted to be struck by a hammer or the like, or engaged by a wrench, to turn the plug 21 in screwing said plug to or from its final adjusted position.

A number of holes 25 through the cylindrical portions 8 and 9 perform the functions of permitting any particles of coke, or other substances, to be discharged when the plug 11 is out and the tube is being cleaned by operation of any appropriate device used for that purpose. These holes 25 also function as indicating devices to afford indication to the operators when there is a leak around the plug 11, because the leaking fluid will emerge through and become visible at the holes 25. These holes 25 open between the plugs 11 and 21 when the device is assembled.

The ends of the device 7 are attached to the ends of the respective tubes 1 and 2 by coupling sleeves 26 having internal threads 27 at one end and internal threads 28, of different pitch from the threads 27, at the opposite end. The threads 27 are screwed onto threads 29 formed on the end portions of the tubes 1 and 2, while the threads 28 are screwed onto threads 30 formed on the end portions of the device 7. Thus, the coupling sleeve 26 is a differential thread coupling and all of said threads 27, 28, 29 and 30 may be of a modified Acme type. However, these threads may be standard V threads, standard U. S. V threads, full Acme threads, semi-Acme threads, or threads of the buttress type. The threads 29 and 30 run in the same direction, as also do the threads 27 and 28. As an illustration, the threads 27 and 29 may be six pitch right hand threads and the threads 28 and 30 may be four pitch right hand threads. Each coupling sleeve 26 is formed with an internal relief or recess 31 between the threads 27 and 28, which recess is opposite the joint formed by the abutting ends 5 and 6 of the tubes and the connecting device when said connecting device is assembled in final position in connection with the tubes. This recess 31 is of comparatively short length, so that the coupling sleeve 26 for almost its entire length is in direct contact with the tubes and the connecting device and is subject and immediately responds to any variations of high temperature to which the tubes and the connecting device are subjected by variations in the temperature of the oil, or other liquid or gaseous fluid, contained in or passing through said tubes and connecting device. This construction is particularly desirable at the present time in oil cracking stills in which high temperatures and high pressures are used, such temperatures frequently exceeding 1000° F. and the pressures ranging upwardly to as high as 3000 pounds per square inch. These temperatures and pressures are now generally considered as the ultimate temperatures and pressures to be desired or utilized by refining engineers. Since the coupling device shown is in direct contact with the tubes and with the connecting device therefor, it must be apparent that said connecting device will respond almost instantly to changes of temperature of the metal in the tubes and the connecting device therefor, thus greatly minimizing the possibility of leakage occurring at the joint.

In the construction shown, a tubular insert 32 crosses the joints 5—6 at the connection of each tube with the connecting device 7. This insert may be made of seamless steel tubing, or the cylinder formed otherwise, of plain carbon steel or of suitable alloys. This insert is applied by forming a counter-bore 33 in the end of the tube to which the insert is to be applied and of radial depth approximately equal to the radial thickness of the wall of the insert, so that the inner surface of the insert will be in smooth and even continuation of the inner surface of the tube to which the insert is connected. The insert is inserted in the counter-bore 33, after which a suitable spinning tool 34 is inserted in the insert before the device 7 is attached and operated to expand the insert slightly and set it against the annular wall of the counter-bore 33 and against the end wall 35 of said counter-bore. These inserts may be assembled in connection with the tubes in this way and the tubes shipped to the refinery with parts of the inserts extending beyond the ends of the tubes. Preparatory to attaching the connecting device 7 to the tubes, the coupling devices 26 are screwed along the threads 29 to proper positions. Then the threads 30 on the ends of the connecting device 7 are applied against the threads 28 and the coupling devices are then screwed outwardly along the threads 29. Due to the greater pitch of the threads 28 and 30, the ends of the connecting device 7 will be moved inwardly toward the ends of the tubes 1 and 2 to a greater extent than the coupling devices 26 move outwardly along the threads 29. The parts are proportioned in such a way that when the internal reliefs or recesses 31 are around the joints 5—6, said joints are closed and a leakproof joint is formed by screwing the coupling devices 26 outwardly until the ends of the connecting device 7 are clamped very closely against the ends of the tubes 1 and 2.

The ends of the connecting device 7 are provided with counter-bores 36 receiving the ends of the inserts 32. Thus, the inserts 32 cross the joints 5—6 and extend well into the tubes 1 and 2 and into the ends of the connecting device 7. After the coupling devices 26 are tightened, the spinning tool 34 is passed through the openings 10 and into the inserts 32 across the joints 5—6 and operated to expand the inserts across said joints and to the outer ends of the inserts within the connecting device 7. This operation of the spinning tool communicates the inserts 32 into abutting contact with the end walls 37 of the counter-bores 36. When the connecting device 7 is first attached, the inserts 32 do not extend to the ends 37 of the counter-bores 36 but terminate a slight distance away from said ends 37; and it is only by operation of the spinning tool 34 that the inserts 32 are expanded to the ends 37 of the counter-bores 36.

The coupling devices 26 are formed on their outer ends with projections 38 separated by spaces 39. An operating tool may be engaged with the projections 38 in the spaces 39 and used and manipulated to operate the coupling devices in the manner explained. The coupling devices 26 are also provided with holes 40 opening into the relief or recess 31. These openings 40 constitute means by which the joints 5—6 may be inspected. Also any fluid leaking through the joints 5—6 will become visible through these holes 40.

Figure 4:
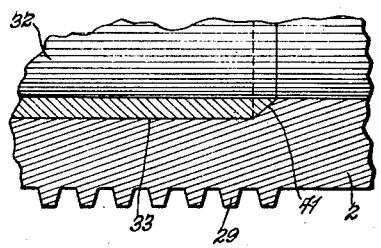
Fig. 4 is an enlarged sectional view showing another form of joint between one end of a liner member and the tube in which said liner member is mounted.
Figure 5:
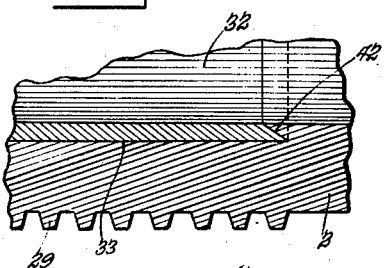
Fig. 5 is an enlarged sectional view showing another form of such joint.

As shown in Fig. 3, the end walls 35 and 37 of the counter-bores 33 and 36 are radial. However, different types of joints of the ends of the insert 32 with the ends of the counter-bores may be provided. As shown in Fig. 4, inclined end walls 41 may be formed at the ends of the counter-bores and the spinning tool 34 will operate to expand the insert 32 in conformity with the inclined wall 41. Or, as shown in Fig. 5, grooves 42 may be formed at the ends of the counter-bores and the ends of the insert 32 expanded into said grooves. These are merely illustrative of different types of end joints for the insert 32.

A connecting device, shown in Figs. 6 and 7, differs in form from the connecting device 7 by omitting one of the extended tubular portions 8 or 9 and equipment in connection therewith. In the form shown in Fig. 6, the connecting device 43 has its end portions abutting and hermetically jointed with the ends of the tubes 1 and 2 by coupling devices 26, already described. A single extended tubular portion 44 is provided in connection with the connecting device 43 in alinement with one of the tubes. The plug devices and other elements assembled in connection with the tubular portion 44 are the same as the plug devices assembled in connection with each tubular portion 8 or 9, already described, and like reference numerals are applied thereto since the parts are the same and perform the same functions.

The device 43 that connects the tubes 1 and 2 at one end has its plug 11 in alinement with either end of said tubes, for instance, in alinement with the tube 2; while the connecting device that connects the adjacent ends of the tubes 1 and 3 has its plug 11 in alinement with the tube 1; or this arrangement may obviously be reversed. And the connecting device that connects ends of the tubes 2 and 4 has its plug opening into the tube 4.

This permits a cleaning device to be extended into and operated in every one of the tubes without providing access openings at both ends of each tube.

A fulcrum boss 45 is formed in connection with the outer side of the coupling device 43 in axial alinement with the end that is opposite the tubular portion 44.

A wrench, for cooperating with the tubular portions 8, 9 and 44 to operate the couplings 26, is shown in Figs. 8 and 9. This wrench comprises a tubular socket 46 adapted to be fitted upon the respective tubular portions 8, 9 and 44. The socket 46 is rotative about any one of said tubular portions on which it is placed and is formed in integral connection with an arcuate elongated skirt 47 having spaced teeth 48 adapted to extend into the notches 39 and engage the projections 38. When this wrench is mounted and held in this position, it is operative to turn the engaged couplings 26 in either direction. The wrench may be provided with a handle lever 49, whereby the wrench may be turned and, if desired, the wrench may also be formed with an extended portion 50 having therein a hole 51 adapted to receive a handle or lever for operating the wrench. A connection 52 may be secured to the outer end of the extension 50 to afford means whereby the wrench may be held on the tubular portions 8, 9 or 44 and prevented from slipping out of engagement with the couplings 26 during operation of the wrench.

A wrench, for engaging and fulcruming on the wrench bosses 45 and for operating the couplings 26, is shown in Figs. 6 and 7. This wrench comprises a socket 53 adapted to receive a wrench boss 45 and turn about the same. An arcuate skirt 54 is formed in integral connection with the socket 53 and has teeth 55 adapted to extend into the notches 39 and engage the projections 38 in order to turn the couplings 26. A projecting portion 56, in integral connection with the socket 53, constitutes a handle that may be struck or engaged by an appropriate tool in order to turn the socket 53 about the fulcrum 45 as an axis. The wrench, being held in engagement with the coupling 26, will rotate said coupling when the wrench is operated.

A wrench, for engaging and operating the plugs 21, is shown in Figs. 1 and 2. This wrench comprises a cylindrical portion 57 adapted to extend into the hollow portion of any one of the plugs 21 and to rotate therein. A number of lugs are formed in integral connection with this wrench and are designed and adapted to engage the laterally extended arms 24 that are formed in integral connection with plugs 21 and thereby turn said plugs 21 when the wrench is operated. In the specific form shown, there are three arms 24 in connection with each plug 21 and there are six lugs in connection with each wrench. However, the number of the arms 24 and the number of the lugs may be varied without departing from the principle of the invention. A handle 59 constitutes means for operating this wrench.

It must be apparent that this invention obtains all of its intended objects and purposes efficiently and satisfactorily and is capable of considerable variation as to form and arrangement within the scope of equivalent limits. I contemplate such variations as may be desirable to adapt the invention to connect tubes arranged in parallel relationship or otherwise, and, without restricting myself in these or other unessential particulars, I claim:

1. The combination with two tubes, of a tubular device having its ends connected and forming joints with ends of said tubes, inserts expanded into sealing engagement with the inner walls of the ends of said tubes and said device and across said joints, and means preventing displacement of said inserts.

2. The combination with two tubes having counter-bored portions at their ends, of a tubular device for connecting and establishing communication between said tubes and having its ends counter-bored in conformity with the counter-bored ends of said tubes, couplings attaching the ends of said tubular device to said tubes respectively to form tight joints at said ends, and tubular inserts mounted in and expanded into sealing engagement with the walls of said counter-bored portions of said tubes and said tubular device and across said joints.

3. The combination with two tubes, of a tubular device for connecting and forming communication between said tubes, means for holding said tubular device in rigid connection with said tubes and forming joints at the adjacent ends of said tubes and said device, a tubular insert mounted and expanded into sealing engagement with the inner walls of adjacent end portions of said tubes and said device and extending across said joints and having an internal diameter approximately the same as the internal diameter of said tubes and said device, and means holding said inserts from displacement.

4. The combination with two tubes, of a tubular device having its end abutting and forming joints with the ends of said tubes, tubular inserts extending and expanded into sealing engagement with the inner walls of the ends of said tubes and said tubular device and crossing said joints, and means holding said inserts from displacement longitudinally.

5. The method of forming a joint between two tubular members which consists in placing one end portion of a tubular insert in one end of one of said tubular members and leaving the other end portion of said insert extended beyond said tubular member, expanding that portion of said insert that is in said tubular member into close frictional engagement with said tubular member and leaving said extended end portion of said insert unexpanded, attaching the other tubular member to said first tubular member with said unexpanded end portion of said insert extending into said other tubular member across the joint between said two tubular members, and then expanding that portion of said insert that extends beyond said first tubular member and into said second tubular member.

6. The combination with two tubes, of a tubular device having its ends abutting and forming joints with the ends of said tubes, a coupling member differentially screwed on the end of each tube and the adjacent end of said tubular device and holding said tubular device in abutting engagement with the ends of both of said tubes, and seamless tubular inserts expanded into sealing engagement with the inner walls of the ends of said tubes and said device and across said joints and thereby rendering said joints impervious.

7. The combination with two tubes, each having one end portion circumferentially threaded, and two sections of seamless tubing, each having one end portion expanded into frictional engagement with the inner wall of the threaded end portion of one of said tubes and the opposite end portion projecting beyond said tubes, of a tubular U-bend having end portions circumferentially threaded differentially with respect to the threaded ends of said tubes receiving the projecting ends of said sections or tubing, and coupling sleeves differentially threaded at their ends screwed on said tubes and said U-bend and holding the same in endwise abutting engagement.

8. The method of forming a joint between two tubular members which consists in placing one end portion of a seamles tubular insert in one end of one of said tubular members and leaving the other end portion of said insert extended beyond said tubular member, expanding that portion of said insert that is in said tubular member into close frictional engagement with said tubular member and leaving said extended portion of said insert unexpanded, clamping the end of the other tubular member into endwise abutting engagement with said first tubular member with said unexpanded end portion of said insert extending into said other tubular member across the joint of said two tubular members, and then expanding that portion of said insert that extends into said other tubular member to form a hermetic joint.

9. The method of attaching a U-bend to two tubes which consists in placing one end portion of a seamless tubular insert in one end of each of said tubes and leaving the other end portions of said inserts extended beyond said tubes, telescoping the end portions of a U-bend on the extended portions of said inserts, clamping the ends of said U-bend against the ends of said tubes, and then expanding said inserts into close frictional engagement with said tubes and said U-bend throughout the length of said inserts.

FREDERICK E. KEY.